(12) United States Patent  (10) Patent No.: US 6,493,510 B2
Shimizu  (45) Date of Patent: Dec. 10, 2002

(54) CAMERA HAVING ZOOM FLASH DEVICE

(75) Inventor: Motokazu Shimizu, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/820,787

(22) Filed: Mar. 30, 2001

(65) Prior Publication Data

US 2001/0028792 A1 Oct. 11, 2001

(30) Foreign Application Priority Data

Mar. 31, 2000 (JP) ........................................ 2000-099584

(51) Int. Cl.$^7$ ........................... G03B 17/00; G03B 15/03
(52) U.S. Cl. ............................................. 396/62; 396/79
(58) Field of Search ..................... 396/62, 175, 79–83

(56) References Cited

U.S. PATENT DOCUMENTS 4,914,461 A * 4/1990 Hori .............................. 396/62
5,819,121 A * 10/1998 Tsuboi .......................... 396/80

FOREIGN PATENT DOCUMENTS

JP           4-235511 A      8/1992    ............ G02B/7/10

* cited by examiner

*Primary Examiner*—W. B. Perkey
(74) *Attorney, Agent, or Firm*—Young & Thompson

(57) ABSTRACT

A camera has a zoom optical system, which includes three lens groups disposed on an optical axis, for being set at least between a wide-angle end and a telephoto end. A zoom motor with plural barrels is movable in first and second moving region continuous with each other, for moving the zoom optical system along the optical axis. The first moving region is adapted to zoom the zoom optical system. A flash emitter emits flash light to a photographic field within an illuminating angular range. A cam groove has a transmission section and a non-transmission section. The transmission section operates in combination with a driving pin when the zoom motor is in the first moving region, for changing the illuminating angular range. The non-transmission section operates when the zoom motor is in the second moving region, for keeping the illuminating angular range unchanged.

17 Claims, 15 Drawing Sheets

CAMERA HAVING ZOOM FLASH DEVICE

BACKGROUND OF THE INVENTION

1. Field of the Invention

The present invention relates to a camera having a zoom flash device. More particularly, the present invention relates to a camera having a zoom flash device including a zoom optical system and a flash emitter, and in which emission of flash light in the flash emitter can be optimized in any zoom position from a wide-angle end to a telephoto end in the zoom optical system.

2. Description Related to the Prior Art

A zoom flash device is known, which has a zoom optical system, in which a zoom motor drives and zooms the zoom optical system, and in which an illuminating angular range of flash light is changed according to zooming. To change the illuminating angular range, angles of portions of a reflector are changed. Also, distances from a Fresnel lens to a flash discharge tube and the reflector are changed.

JP-A 4-235511 discloses the zoom optical system of a type in which one of plural lens groups is a focusing lens group. A zoom position and an object distance are considered to calculate and obtain an in-focus position. The focusing lens group is moved to the in-focus position for focusing. A focusing motor, which is additional to the zoom motor, is driven to move the focusing lens group to the in-focus position. To move the focusing lens group with precision, a rotary encode is combined with the focusing motor, detects a rotational angle of the focusing motor to control a stop of the focusing motor.

When the focusing lens group in the zoom optical system is moved to the in-focus position according to a certain object distance, there is a tendency in that a moving amount of the focusing lens group is higher in zooming to the wide-angle side and smaller in zooming to the telephoto side. According to the prior art, definition of a rotary encoder is predetermined so as to obtain sufficient precision at a wide-angle end.

If the zoom optical system has a high zoom ratio, this tendency becomes more conspicuous. A rotary encoder of a high precision is required for obtaining sufficient precision in focusing at the wide-angle end, and causes a high cost. Furthermore, a moving amount of the focusing lens group at a telephoto end is specifically high. There occurs a problem in taking long time in the focusing operation. So it is conceivable to move all the lens groups together for focusing at the wide-angle end by use of rotation of the zoom motor.

However, there occurs a problem in use of a zoom flash device in a camera in which focusing is effected at the wide-angle end by driving the zoom motor. As the illuminating angular range is changed according to rotation of the zoom motor, the illuminating angular range is changed also in the course of focusing at the wide-angle end. This lowers distribution in emitting flash light when the zoom optical system is set at the wide-angle end.

SUMMARY OF THE INVENTION

In view of the foregoing problems, an object of the present invention is to provide a camera having a zoom flash device including a zoom optical system and a flash emitter, and in which an illuminating angular range of flash light can be determined suitably so that emission of flash light in the flash emitter can be optimized in any zoom position from a wide-angle end to a telephoto end in the zoom optical system.

In order to achieve the above and other objects and advantages of this invention, a camera has a zoom optical system, which includes plural lens groups disposed on an optical axis, for being set at least between a wide-angle end and a telephoto end. A lens moving mechanism is movable in first and second moving regions continuous with each other, for moving the zoom optical system along the optical axis, the first moving region being adapted to zoom the zoom optical system. A flash emitter emits flash light to a photographic field within an illuminating angular range. An illuminating range changer has a transmission section and a non-transmission section, the transmission section operating when the lens moving mechanism is in the first moving region, for changing the illuminating angular range, the non-transmission section operating when the lens moving mechanism is in the second moving region, for keeping the illuminating angular range unchanged.

The second moving region is adapted to focus the zoom optical system.

When the lens moving mechanism is in the first moving region, the transmission section decreases the illuminating angular range according to movement of the zoom optical system to the telephoto end. When the lens moving mechanism is in the second moving region, the non-transmission section maximizes the illuminating angular range.

The transmission section moves the flash emitter in a direction along the optical axis.

The flash emitter includes a flash discharge tube for emitting the flash light. A Fresnel lens or flash emitting window is disposed in front of the flash discharge tube, for passing the flash light from the flash discharge tube. The illuminating range changer adjusts a distance of the flash discharge tube from the flash emitting window in a backward direction, the transmission section increases the distance for the flash emitting window to decrease the illuminating angular range, and the non-transmission section minimizes the distance.

The first moving region corresponds to a section between a predetermined zoom position and the telephoto end, and second moving region corresponds to a section between the wide-angle end and the predetermined zoom position. The predetermined zoom position is defined one zoom step shifted from the wide-angle end toward the telephoto end.

The lens moving mechanism includes a zoom motor. The illuminating range changer includes a transmission plate for moving in response to rotation of the zoom motor. A driving pin is formed to project from the transmission plate, for being in a first stroke when the lens moving mechanism is in the first moving region, and being in a second stroke when the lens moving mechanism is in the second moving region. A transmission lever moves the flash emitter by swinging. A cam groove is formed in the transmission lever, for receiving the driving pin, having the transmission section and the non-transmission section, the transmission section being pushed by the driving pin in the first stroke to swing, the non-transmission section keeping free the driving pin in the second stroke, to disconnect the transmission lever from the driving pin.

The transmission plate slides, and the first and second strokes are collinear with each other.

The transmission plate is a transmission rack. Furthermore, a transmission gear train includes input and output gears, the input gears being driven by the zoom motor, the output gear being meshed with the transmission rack.

The flash emitter further includes a flash case for containing the flash discharge tube and for being moved by the transmission lever.

Furthermore, there is a stationary barrel. The lens moving mechanism further includes at least one intermediate barrel, coupled helically with an inside of the stationary barrel, rotated relative to the stationary barrel by the zoom motor, for moving along the optical axis. A movable barrel is contained in the intermediate barrel, for supporting the zoom optical system. At least one cam mechanism moves the movable barrel along the optical axis in response to rotation of the intermediate barrel.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
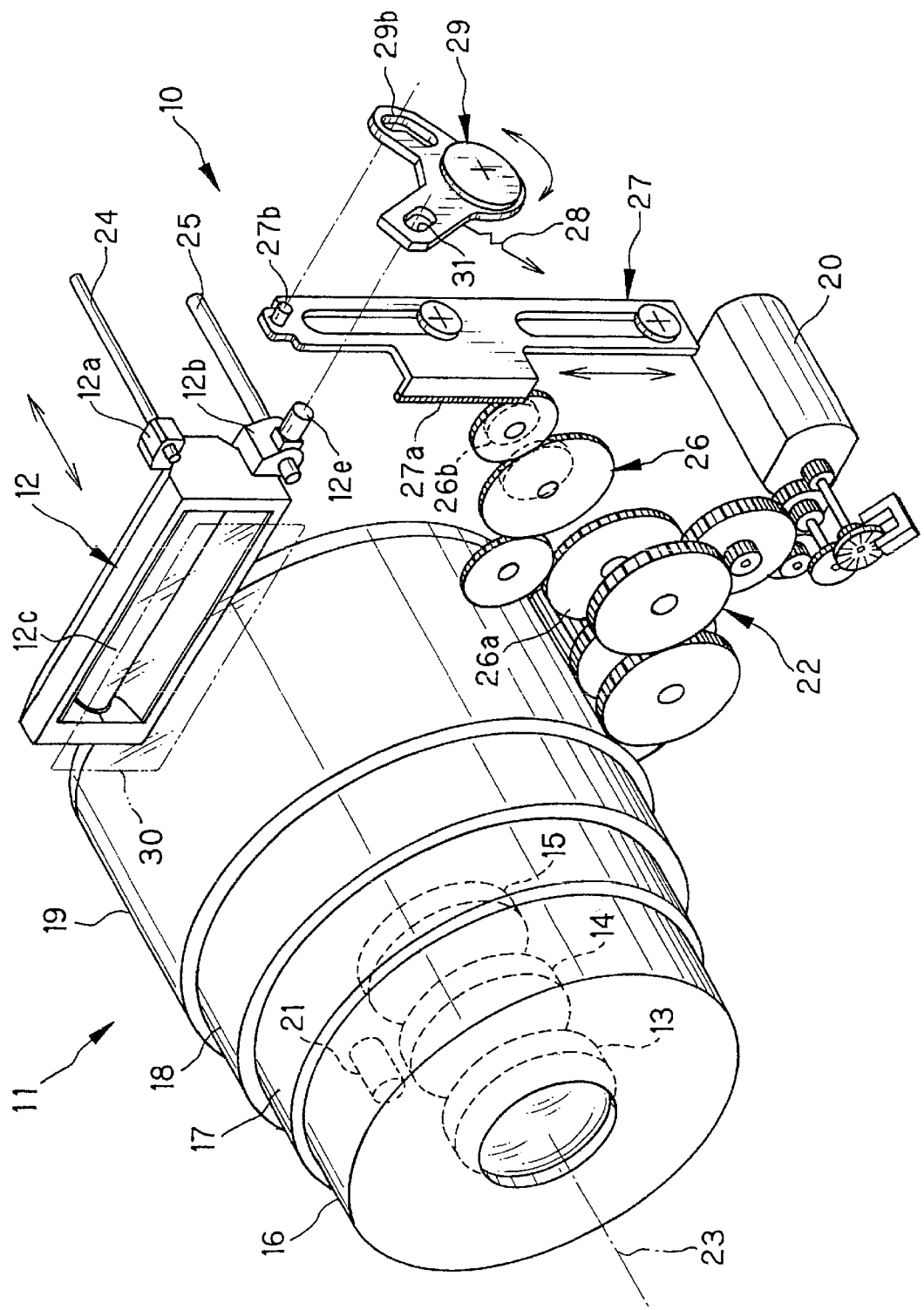
FIG. 1 is a perspective illustrating a zoom flash device.

In FIG. 1, a zoom flash device 10 is a combination of a zoom optical system 11 and a flash emitter 12. When the zoom optical system 11 is zoomed to change a focal length, the flash emitter 12 is moved in parallel with an optical axis 23 to change an area to which flash light is applied by changing an illuminating angle.

The zoom optical system 11 has a movable barrel 16, an inner intermediate barrel 17, an outer intermediate barrel 18 and a stationary barrel 19. Front, middle and rear lens groups 13, 14 and 15 are contained in the movable barrel 16. A zoom motor 20 in a lens moving mechanism drives the outer intermediate barrel 18 to rotate. The outer intermediate barrel 18 rotates, and at the same time moves relative to the stationary barrel 19 in parallel with the optical axis 23. Also, the inner intermediate barrel 17 is caused to move relative to the outer intermediate barrel 18. The movable barrel 16 is caused to move relative to the inner intermediate barrel 17. A motor 21 is incorporated in the movable barrel 16, and causes the middle lens group 14 to move in parallel with the optical axis 23.

A gear train 22 transmits rotation of the zoom motor 20 to the outer intermediate barrel 18. To zoom the zoom optical system 11, the zoom motor 20 is driven. If the zoom optical system 11 is set in a zoom position different from a wide-angle end, the motor 21 for moving the middle lens group 14 is driven for focusing the zoom optical system 11. If the zoom optical system 11 is set in the wide-angle end, only the zoom motor 20 is driven for focusing by moving together the front, middle and rear lens groups 13–15.

The zoom flash device 10 is constituted by the flash emitter 12, a guide mechanism and a linking mechanism. The guide mechanism includes two guide rods 24 and 25 and two guide rod receivers 12a and 12b. The guide rods 24 and 25 are arranged at a suitable interval, and extend in parallel with the optical axis 23. The guide rod receivers 12a and 12b project from a flash case of the flash emitter 12, and receives insertion of the guide rods 24 and 25 in a slidable manner.

An illuminating range changer is constituted by a transmission gear train 26, a transmission rack 27, a spring 28 and a transmission lever 29. The transmission gear train 26 includes an input gear 26a and an output gear 26b. The input gear 26a is meshed with one gear included in the gear train 22. The output gear 26b is meshed with rack teeth 27a of the transmission rack 27. The transmission rack 27 is supported movably in a direction crosswise to the optical axis 23. Upon rotation of the zoom motor 20, the transmission rack 27 moves up and down.

Figure 2:
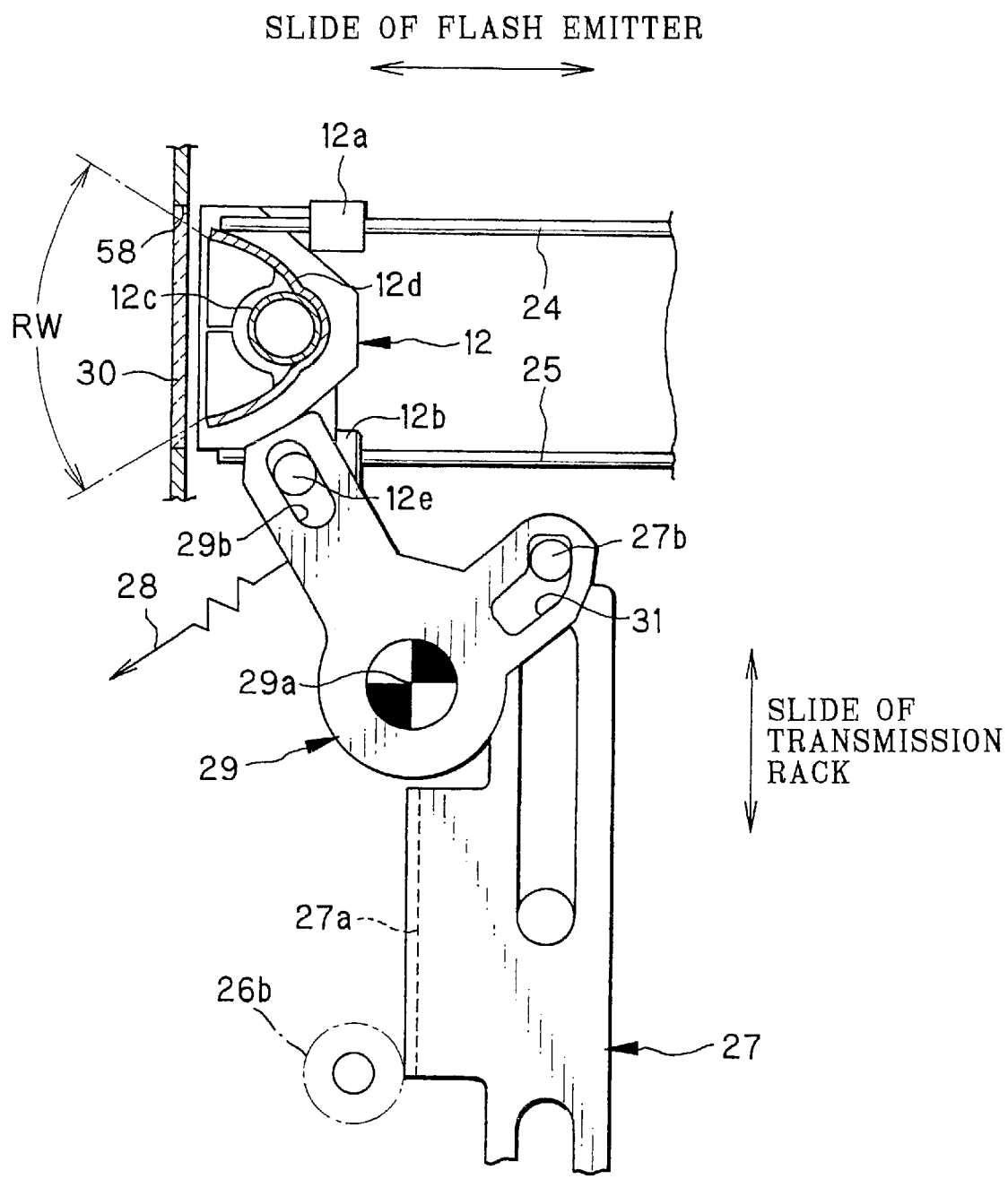
FIG. 2 is an explanatory view in elevation, illustrating a flash emitter and an illuminating range changer in a state of a large illuminating angular range.
Figure 3:
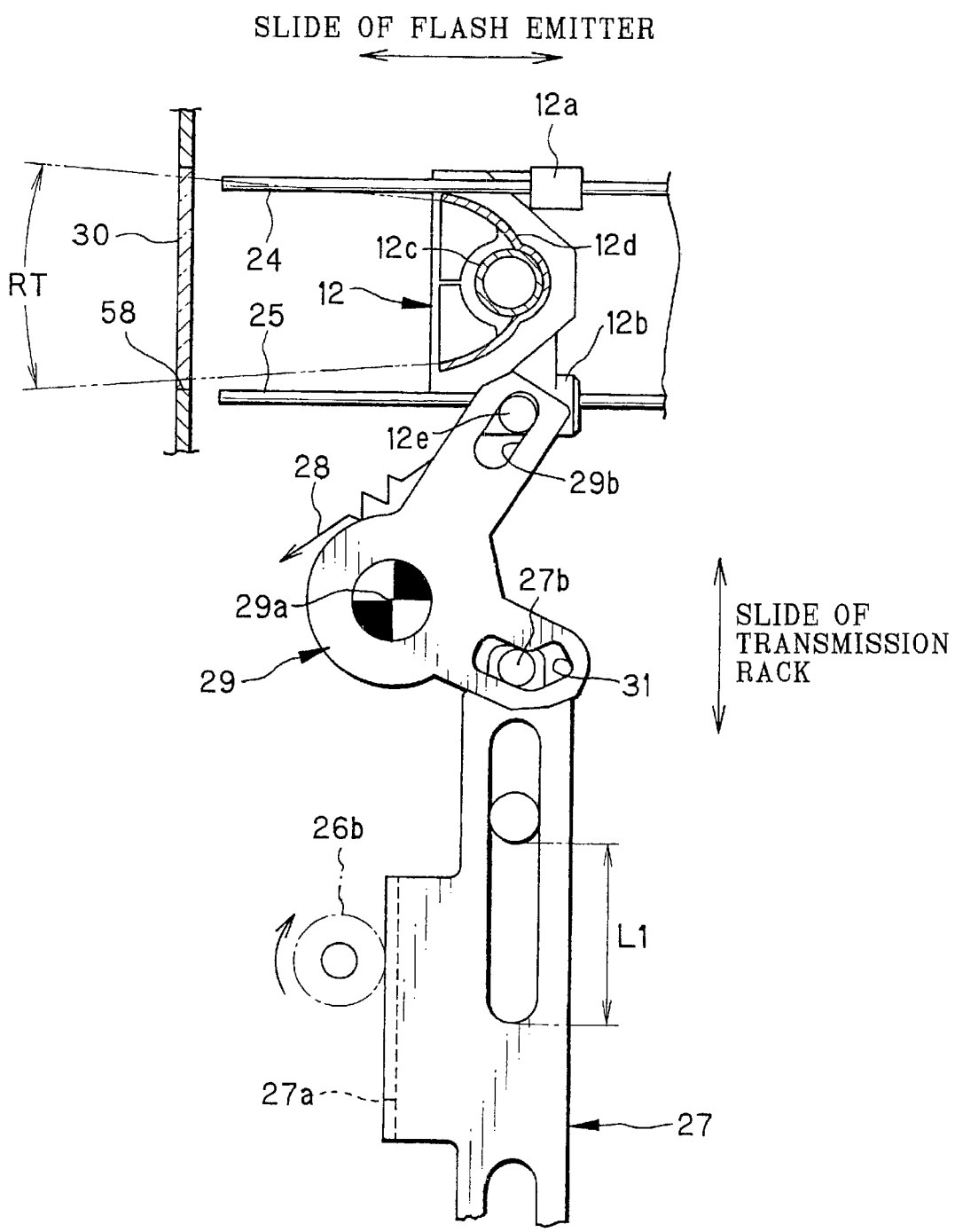
FIG. 3 is an explanatory view in elevation, illustrating the same as FIG. 2 but in a state of a small illuminating angular range.

In FIG. 2, the transmission lever 29 is engaged with portions of the flash emitter 12 and the transmission rack 27. The transmission lever 29 has a pivot 29a about which the transmission lever 29 rotates to move the flash emitter 12. The flash emitter 12 includes a flash case, a flash discharge tube 12c and a reflector 12d. The flash discharge tube 12c is contained in the flash case. A Fresnel lens 30 is disposed in a front wall of a camera. The flash emitter 12 is slidable, and can be set in any position between two limit positions for a large illuminating angular range RW and for a small illuminating angular range RT. The flash emitter 12, when in the front limit position for the large illuminating angular range RW, is positioned the closest to a rear face of the Fresnel lens 30. This position is used when the zoom optical system 11 is set at the wide-angle end. The flash emitter 12, when in the rear limit position for a small illuminating angular range RT, is positioned the farthest from the Fresnel lens 30. See FIG. 3. This position is used when the zoom optical system 11 is set at a telephoto end. In the front wall of the camera, there is a flash emitting window 58 formed for supporting the Fresnel lens 30.

Note that the Fresnel lens 30 operates as condenser lens, and may have a front Fresnel surface and a flat rear surface, or may have a rear Fresnel surface and a flat front surface.

Figure 4:
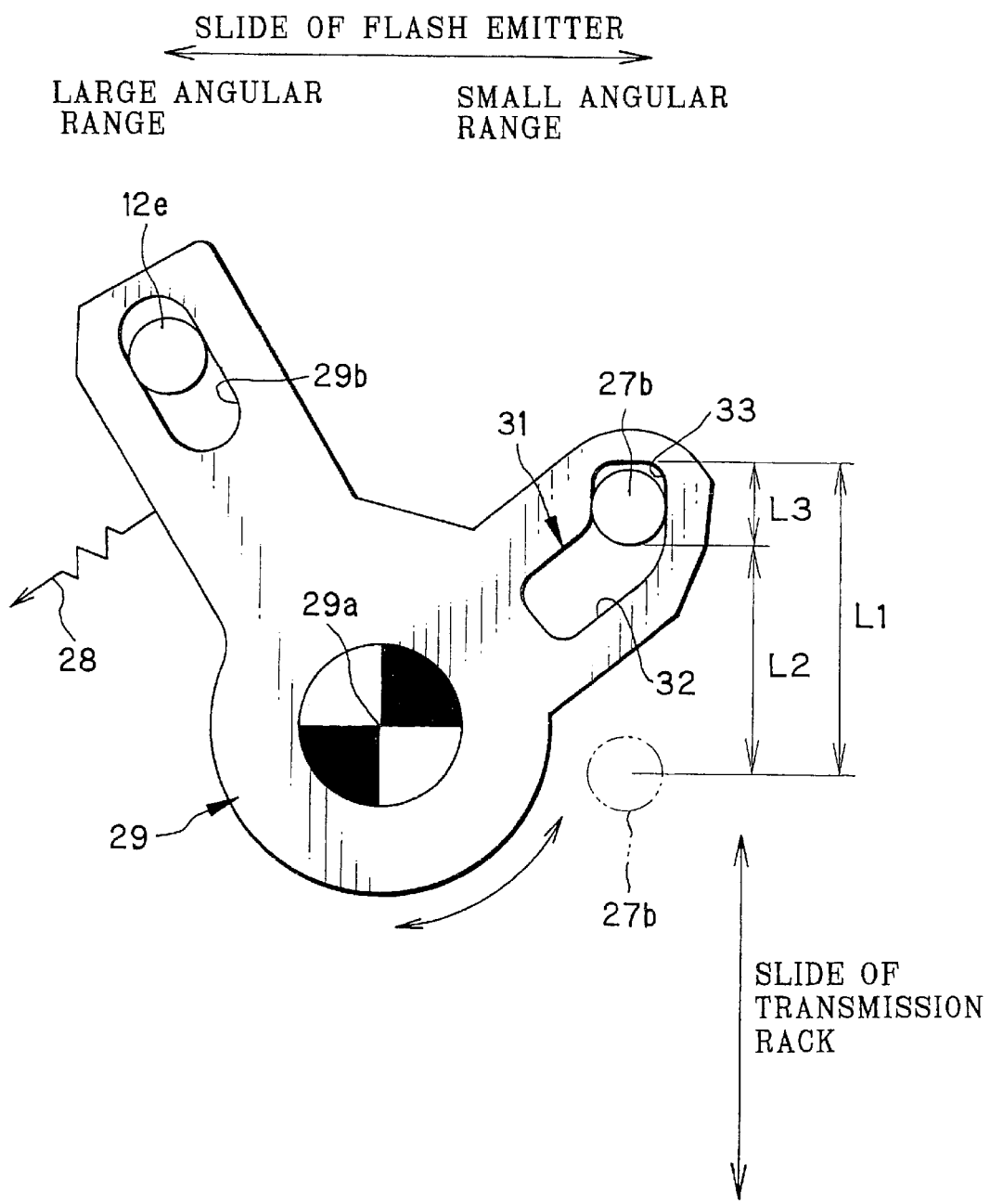
FIG. 4 is an elevation illustrating a transmission lever in the illuminating range changer.

In FIG. 4, the transmission lever 29 includes a flash driving hole 29b and a cam groove 31. A driven pin 12e projects from a flash case of the flash emitter 12, and inserted in the flash driving hole 29b. A driving pin 27b of the transmission rack 27 is inserted in the cam groove 31.

The cam groove 31 includes a transmission section 32 and a non-transmission section 33. The transmission section 32 is directed so as to rotate the transmission lever 29 upon movement of the driving pin 27b. When the zoom optical system 11 is zoomed between the telephoto end and a second zoom position Z1 one step next to the wide-angle end, an edge of the transmission section 32 is driven by the driving pin 27b. Then the transmission lever 29 is caused to rotate at an amount corresponding to a moving amount of the driving pin 27b. In relation to movement of the driving pin 27b, a whole stroke L1 is defined as a range where the driving pin 27b is movable up and down with the transmission rack 27. A stroke L2 is constituted by a lower portion of the stroke L1, and defined as a range where the driving pin 27b is movable while the zoom optical system 11 moves for zooming between the telephoto end and the second zoom position Z1 one step next to the wide-angle end. The transmission section 32 is engaged with the driving pin 27b which is in the stroke L2. The spring 28 biases the transmission lever 29 in a direction to move the flash emitter 12 to the front limit position for the large illuminating angular range RW.

Figure 5:
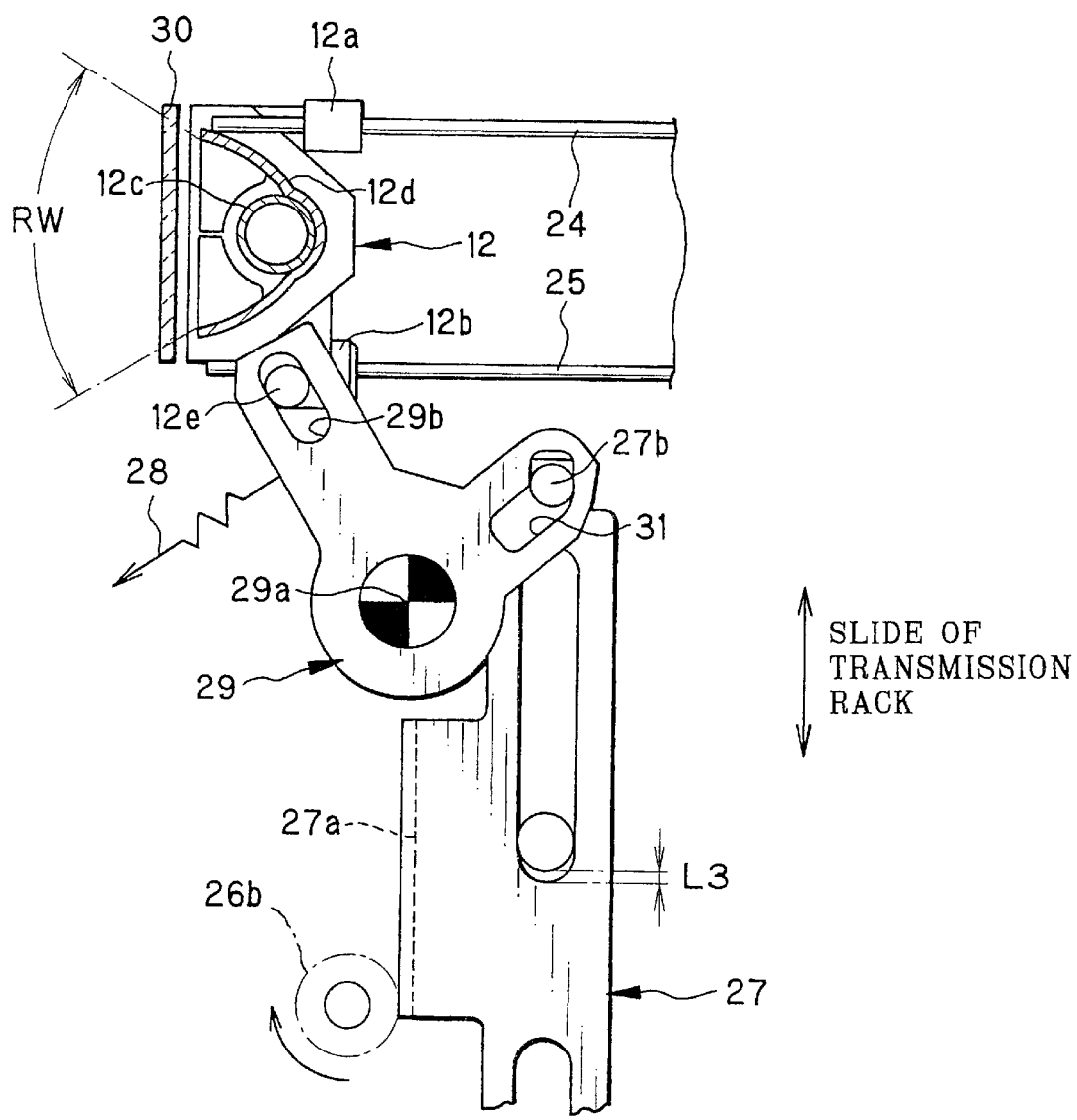
FIG. 5 is an explanatory view in elevation, illustrating the same as FIG. 2 but in which a zoom optical system is about to be zoomed from a wide-angle end.

The non-transmission section 33 does not operate for rotating the transmission lever 29 even upon movement of the driving pin 27b. When the zoom optical system 11 is moved for focusing, the driving pin 27b is allowed to slide in the non-transmission section 33. A stroke L3 is constituted by an upper portion of the stroke L1, and defined as a range where the driving pin 27b is movable while the zoom optical system 11 moves for focusing. The transmission lever 29 does not rotate even upon rotation of the zoom motor 20, because focusing of the zoom optical system 11 at the wide-angle end moves the driving pin 27b only in the stroke L3 illustrated in FIG. 5. Consequently, the flash emitter 12 can be maintained in the front limit position for the large illuminating angular range RW.

Figure 6:
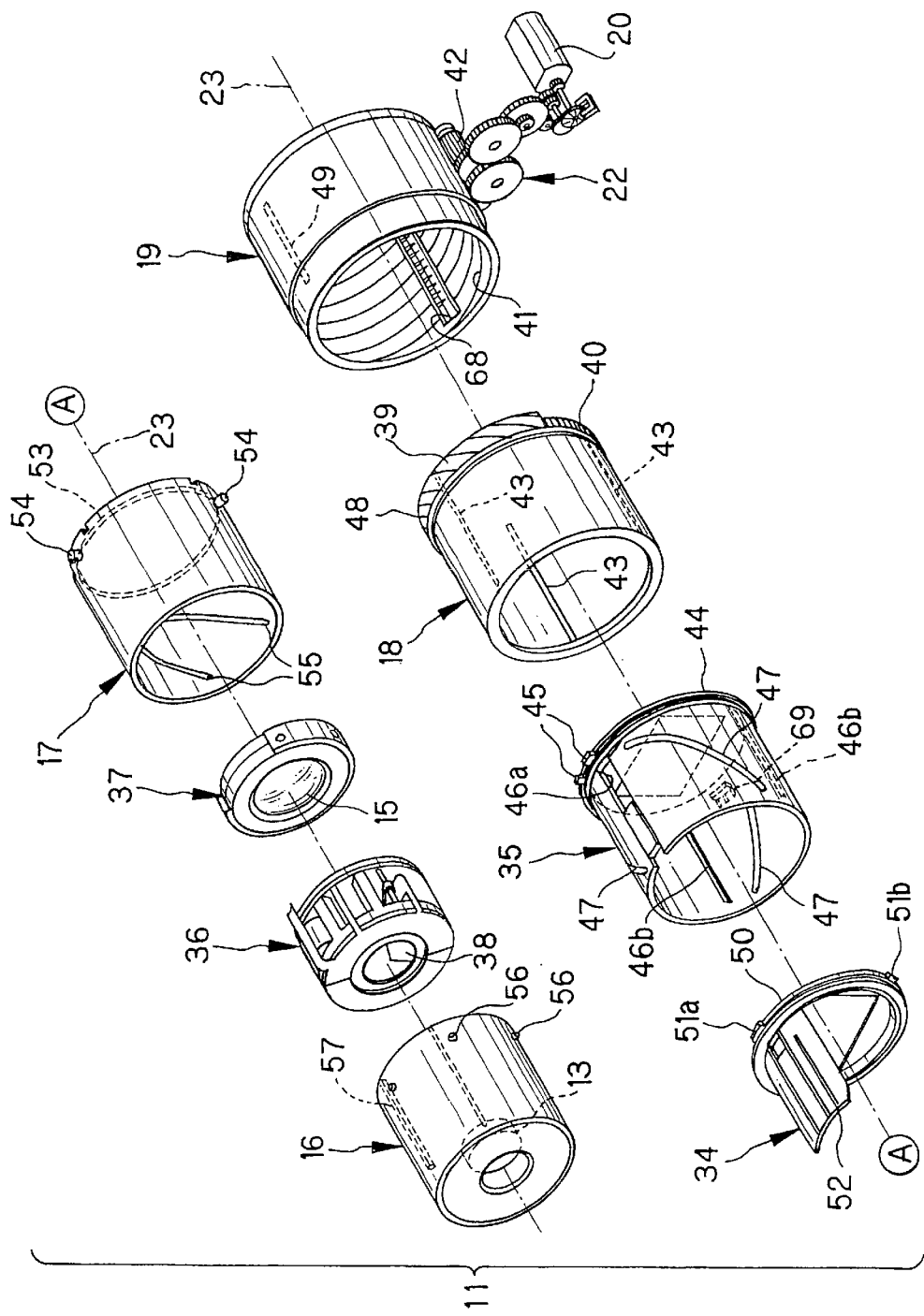
FIG. 6 is an exploded perspective illustrating barrels of the zoom flash device.
Figure 7:
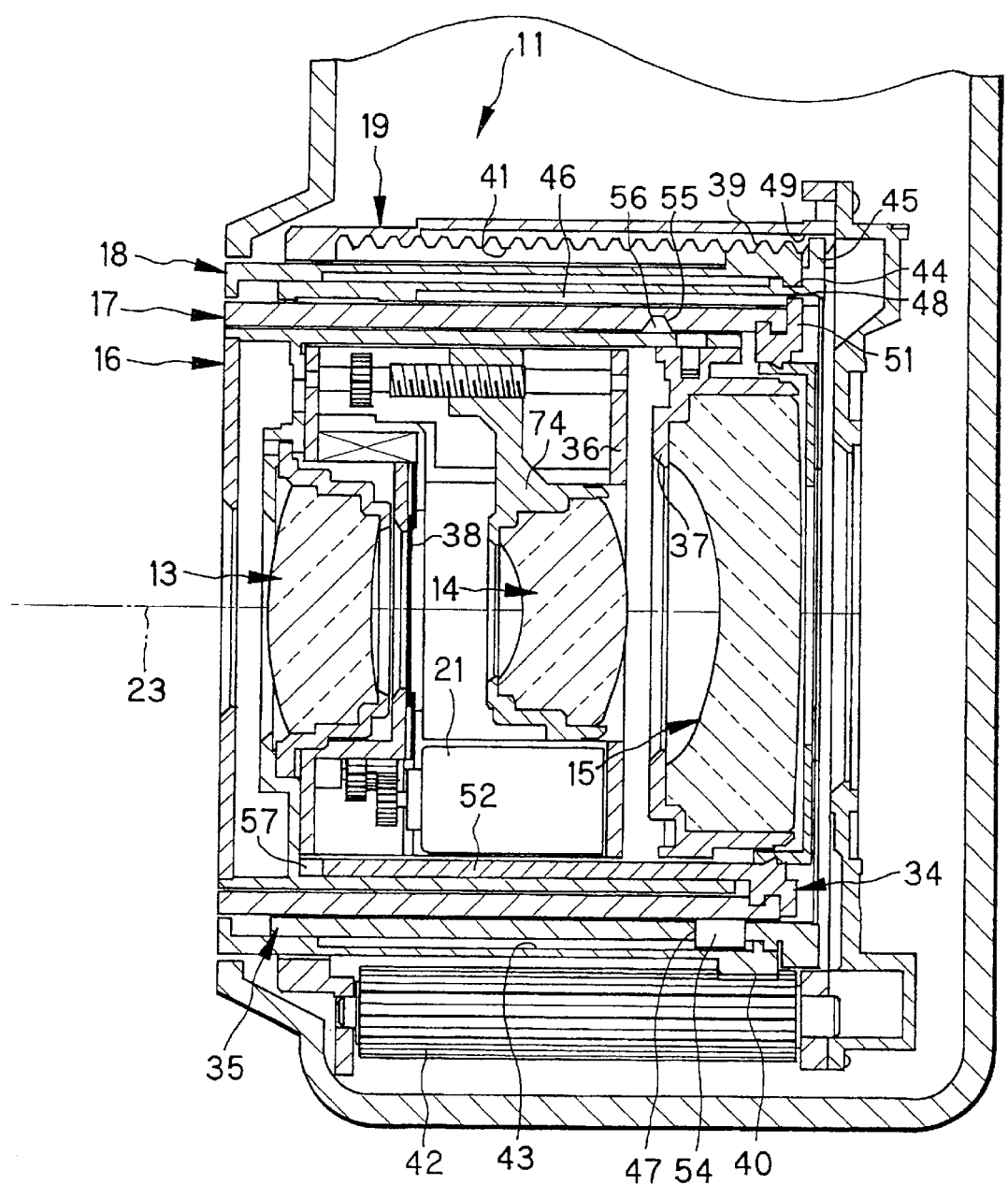
FIG. 7 is a cross section illustrating the zoom optical system and barrels set in a collapsed position.
Figure 8:
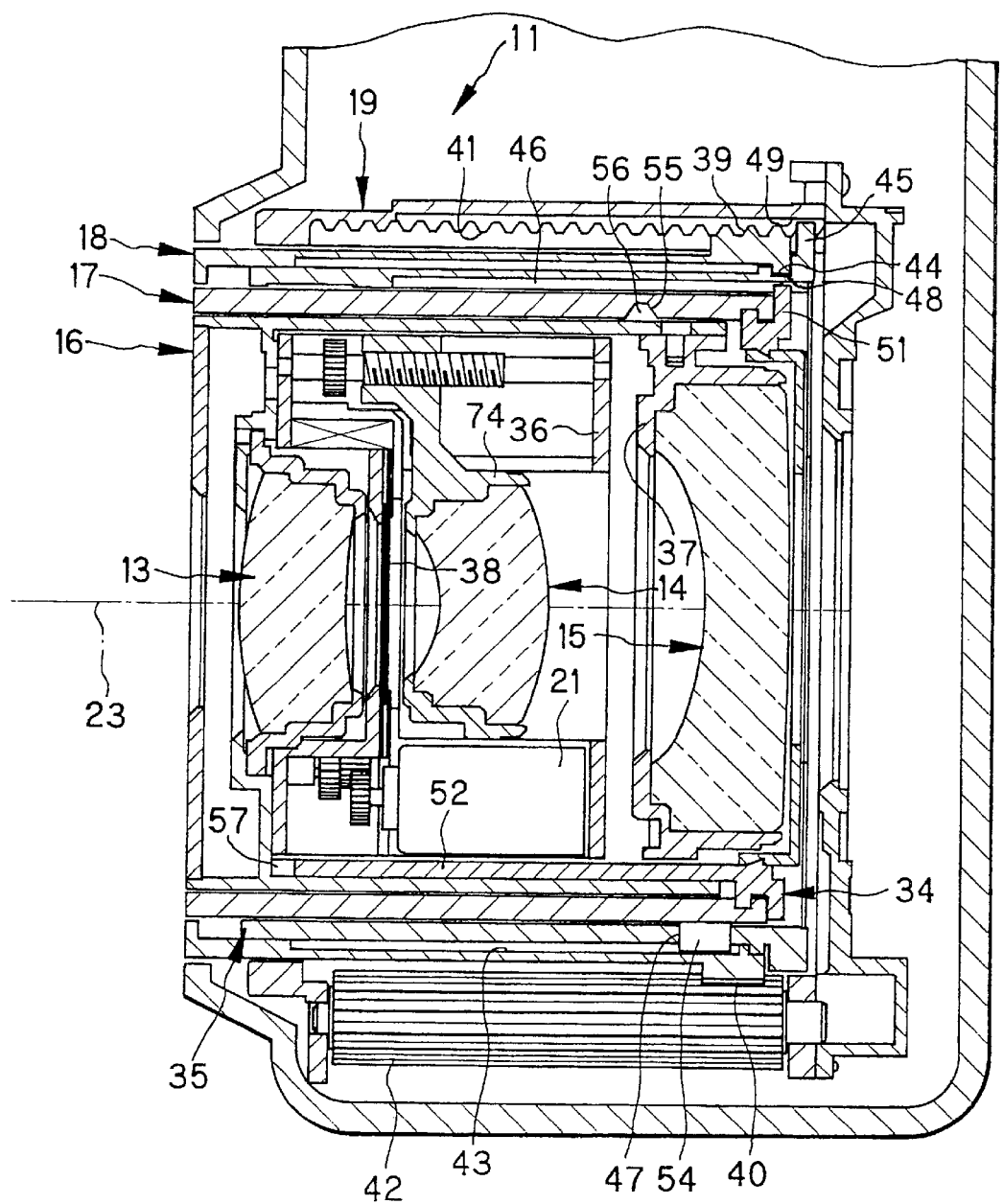
FIG. 8 is a cross section illustrating the zoom optical system and barrels set in a wide-angle end ready position.

The zoom optical system 11 is described next. In FIG. 6, the zoom optical system 11 consists of the movable barrel 16, the inner intermediate barrel 17, a rectilinear key frame 34, a rectilinear cam barrel 35, the outer intermediate barrel 18 and the stationary barrel 19. The zoom motor 20 rotates to move the zoom optical system 11 from a collapsed position in FIG. 7, and zooms the zoom optical system 11 from the wide-angle end in FIG. 8 to the telephoto end in FIG. 9.

The movable barrel 16 includes a front lens holder for the front lens group 13, a middle lens holder for the middle lens group 14, and a rear lens holder 37 for the rear lens group 15. A lens holder barrel 36 is accommodated in the movable barrel 16, and contains the middle lens holder.

The front lens group 13 is positioned inside the movable barrel 16 and the nearest to a photographic field. The lens holder barrel 36 is fixedly secured to the rear of the front lens group 13 inside the movable barrel 16, and provided with a shutter block, the middle lens group 14 and a middle lens moving assembly. The shutter block includes a shutter mechanism 38 and a shutter actuator. The shutter mechanism 38 is disposed behind the front lens group 13. The shutter actuator drives the shutter mechanism 38.

To move the middle lens group 14, the middle lens moving assembly has a moving mechanism and a guide mechanism. The guide mechanism guides the middle lens group 14 in parallel with the optical axis 23 movably between the shutter mechanism 38 and the rear lens holder 37. The moving mechanism includes the motor 21 driven to move the middle lens group 14 in the direction defined by the guide mechanism. The motor 21 for the middle lens group 14 operates for the purpose of focusing at the time of a zoom position different from the wide-angle end, and the purpose of movement from the collapsed position to the wide-angle end. The rear lens holder 37 holds the rear lens group 15 and is secured fixedly to the inside of the movable barrel 16 behind the middle lens group 14.

The outer intermediate barrel 18 is disposed in the stationary barrel 19. A rear portion of the outer intermediate barrel 18 has a male helicoid thread 39 and gear teeth 40. A female helicoid thread 41 is disposed inside the stationary barrel 19, and helically coupled with the male helicoid thread 39. A gear 42 in an axially long shape is associated with the stationary barrel 19, and meshed with the gear teeth 40. The gear 42 extends in parallel with the optical axis 23 and remains in mesh with the gear teeth 40 even when the outer intermediate barrel 18 is moved along the optical axis 23. The zoom motor 20 drives the gear 42. A guide groove 43 of a cam mechanism is formed in an inner wall of the outer intermediate barrel 18, and transmits rotation to the inner intermediate barrel 17.

The rectilinear barrel 35 has a ring-shaped groove 44, a key projection 45, rectilinear grooves 46a and 46b and a first cam groove 47 in the cam mechanism. The ring-shaped groove 44 is formed outside the rectilinear barrel 35 and disposed close to the rear end. A ring-shaped ridge 48 projects from an inner surface of the outer intermediate barrel 18 and disposed close to the rear end. The ring-shaped groove 44 receives insertion of the ring-shaped ridge 48. So the rectilinear barrel 35 is supported in a manner rotatable about the optical axis 23 relative to the outer intermediate barrel 18, and movable together with the outer intermediate barrel 18 in parallel with the optical axis 23. A rectilinear groove 49 is formed in the inner surface of the stationary barrel 19. The key projection 45 is disposed to extend behind the outer intermediate barrel 18, and inserted in the rectilinear groove 49, so as to prevent the rectilinear barrel 35 from rotating relative to the stationary barrel 19.

The rectilinear grooves 46a and 46b operate to prevent the rectilinear key frame 34 from rotating. The first cam groove 47 operates for moving the inner intermediate barrel 17 along the optical axis 23 forwards and backwards.

The rectilinear key frame 34 includes a ring-shaped groove 50, key projections 51a and 51b and an arc-shaped key plate 52. The key projection 51a projects from the periphery of the rectilinear key frame 34, is engaged with the rectilinear groove 46a in the rectilinear barrel 35, and prevents the rectilinear key frame 34 from rotating. The key projection 51b has a different width than the key projection 51a, is engaged with the rectilinear groove 46b to prevent the rectilinear key frame 34 from rotating. The arc-shaped key plate 52 protrudes in parallel with the optical axis 23, and prevents the movable barrel 16 from rotating.

The inner intermediate barrel 17 has a ring-shaped ridge 53, a first cam follower pin 54 and a second cam groove 55. The ring-shaped ridge 53 is engaged with the ring-shaped groove 50 of the rectilinear key frame 34 in a rotatable manner. The first cam follower pin 54 is inserted through the first cam groove 47 of the rectilinear barrel 35, and engaged with the guide groove 43 of the outer intermediate barrel 18. The second cam groove 55 operates to move the movable barrel 16 in parallel with the optical axis 23.

A second cam follower pin 56 and a key ridge 57 project from the movable barrel 16. The second cam follower pin 56 is engaged with the second cam groove 55 in the inner intermediate barrel 17. The key ridge 57 projects from the inner face of the movable barrel 16, is engaged with the arc-shaped key plate 52 of the rectilinear key frame 34, and prevents the movable barrel 16 from rotating. A length of the arc-shaped key plate 52 in parallel with the optical axis 23 is sufficient for keeping engagement with the key ridge 57 even when the movable barrel 16 moves forwards relative to the inner intermediate barrel 17. Cutouts are formed in the periphery of the lens holder barrel 36 and the rear lens holder 37 for receiving entry of the arc-shaped key plate 52.

At the time of zooming, the zoom motor 20 rotates. The rotation is transmitted by the gear 42 to the gear teeth 40 of the outer intermediate barrel 18. The outer intermediate barrel 18 moves along the optical axis 23 in rotation according to a lead of the male and female helicoid threads 39 and 41. The rectilinear barrel 35 moves together with the outer intermediate barrel 18 in a state prevented from rotating in the stationary barrel 19. Rotation of the outer intermediate barrel 18 is transmitted to the inner intermediate barrel 17, so the inner intermediate barrel 17 moves and also rotates according to a shift of the first cam groove 47 in parallel with the optical axis 23. The rectilinear key frame 34 moves with the inner intermediate barrel 17 in parallel with the optical axis 23 in a state prevented from rotating in the rectilinear barrel 35. The movable barrel 16 rectilinearly moves according to a shift of the second cam groove 55 along the optical axis 23 in a state prevented from rotating relative to the rectilinear key frame 34. Therefore, the lens groups 13–15 move together in parallel with the optical axis 23 by an amount of a sum of component amounts of moving the outer intermediate barrel 18, the inner intermediate barrel 17 and the movable barrel 16.

Figure 10A:
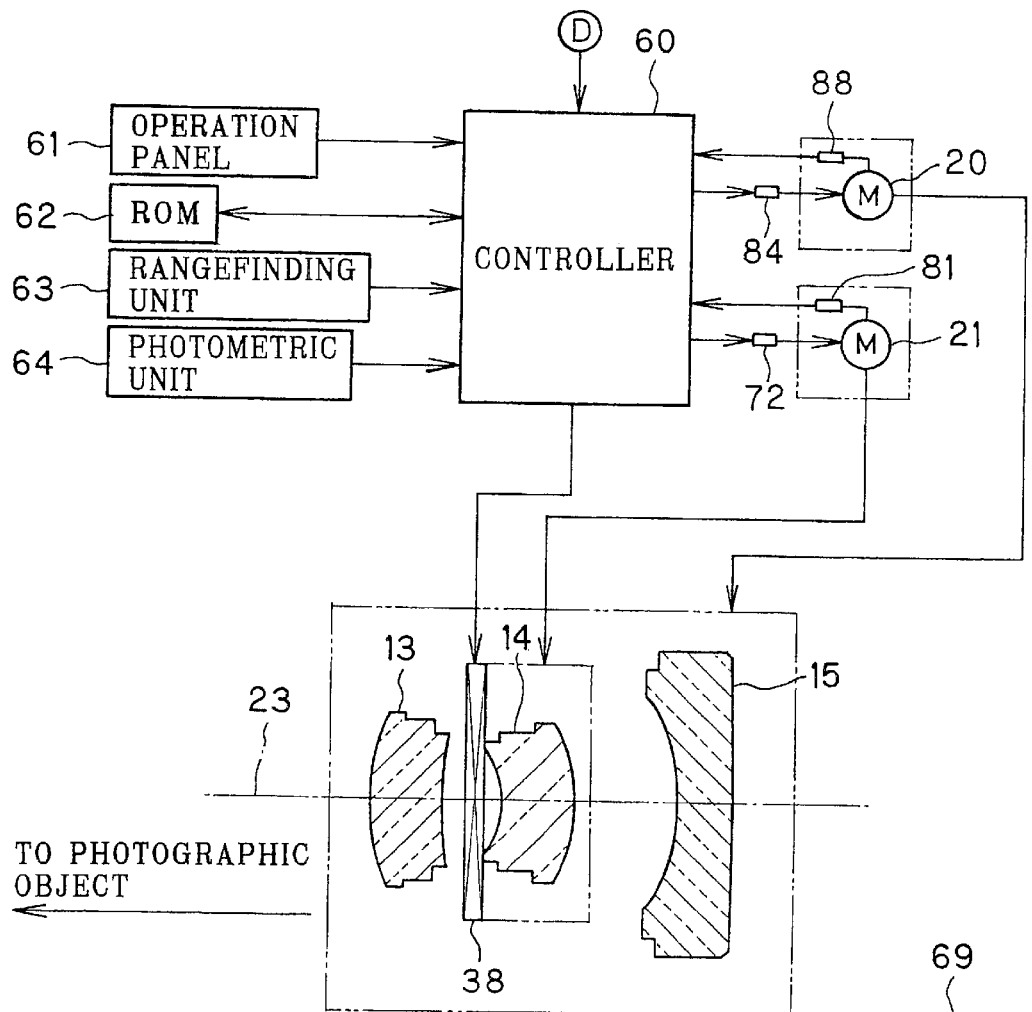
FIG. 10A is a block diagram illustrating circuits for the barrels with the zoom optical system.
Figure 10B:
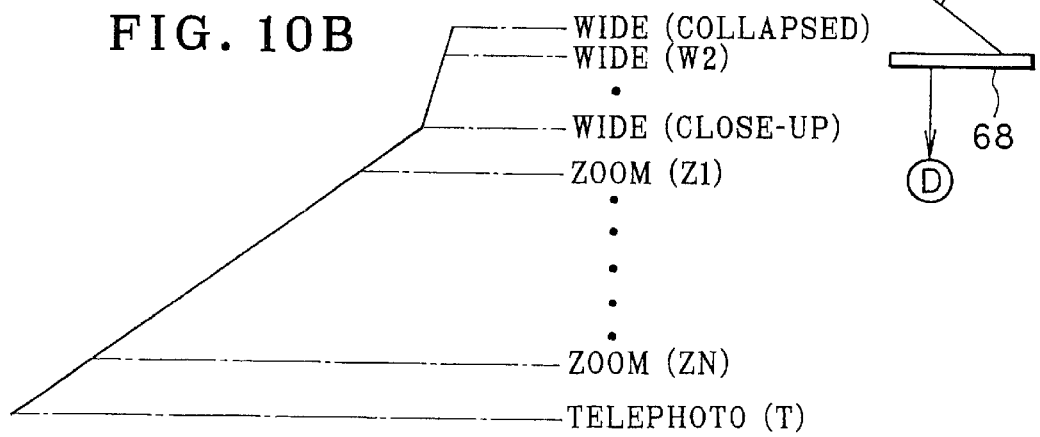
FIG. 10B is a graph illustrating zoom positions associated with a shape of a cam groove.

In FIG. 10, the camera has a controller 60. There are an operation panel 61, a ROM 62, a rangefinding unit 63 and a photometric unit 64 connected to the controller 60. The operation panel 61 includes a power switch, a zoom button and a shutter release button. When the power switch is turned off, the controller 60 responsively drives the zoom motor 20, and moves the zoom optical system to the collapsed position where the movable barrel 16, the inner intermediate barrel 17 and the outer intermediate barrel 18 are contained in the camera body. See FIG. 7. When the power switch is turned on, the controller 60 responsively drives the motor 21, and moves the middle lens group 14 to an original position the closest to the front lens group 13. See FIG. 8. The zoom optical system 11 is set at the wide-angle end ready position upon turning on of the power switch.

Figure 9:
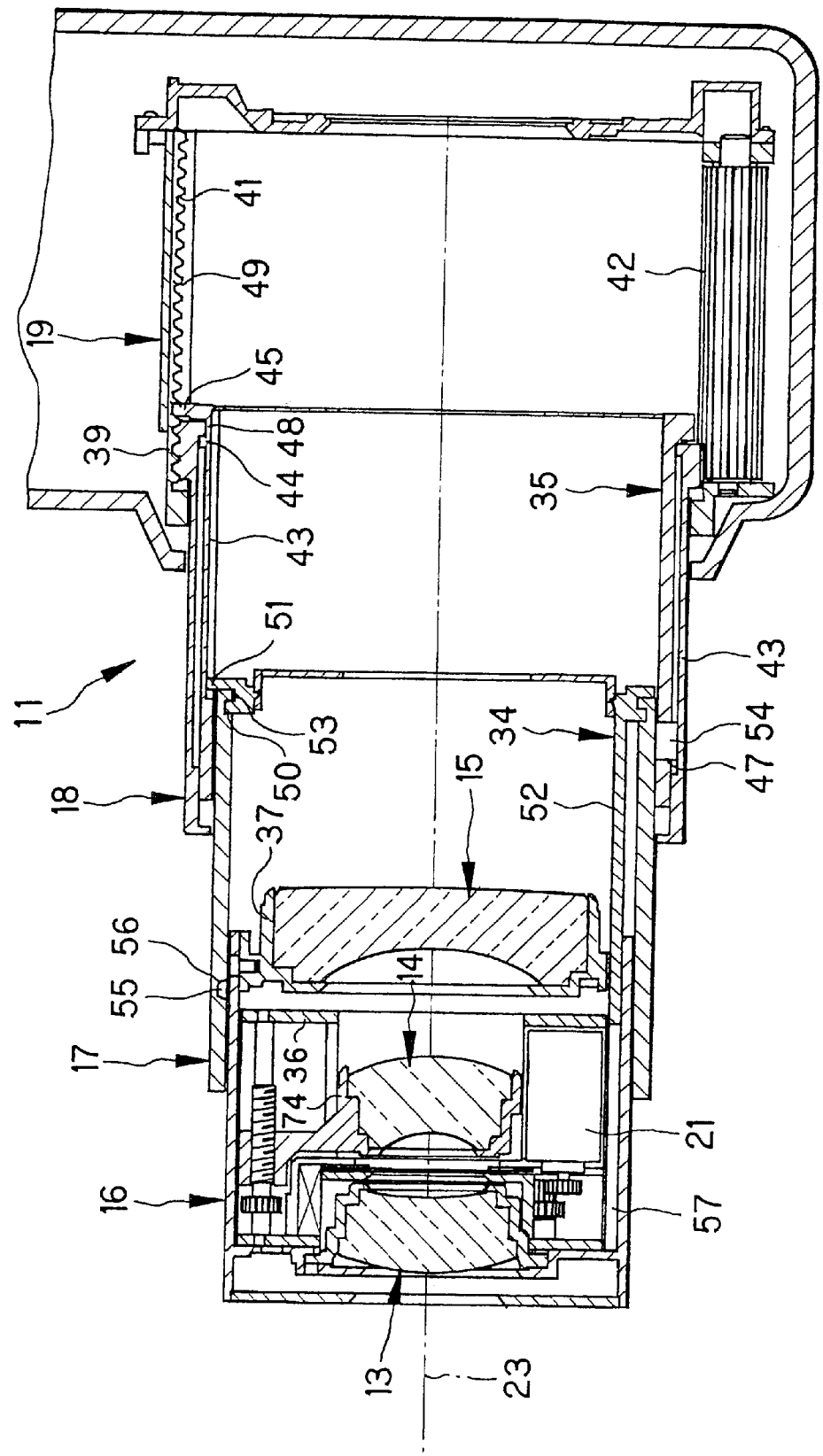
FIG. 9 is a cross section illustrating the zoom optical system and barrels set in a telephoto position.

When the zoom button is operated in the state of the wide-angle end, then the zoom motor 20 is driven to move forwards the movable barrel 16, the inner intermediate barrel 17 and the outer intermediate barrel 18 to zoom the optical system toward the telephoto end, which is illustrated in FIG. 9.

When the power switch is turned off, the controller 60 drives the zoom motor 20 to return from one zoom position to the collapsed position. Afterwards, the controller 60 drives the motor 21 to move the middle lens group 14 to a position the closest to the focal plane.

The zoom optical system 11 is a step zoom type, in which only a limited number of zoom positions are predetermined and used within a range between the wide-angle and telephoto ends. There is a zoom position detector constituted by a code board 68 and a contact brush 69. The code board 68 has a contact point pattern disposed on an inner face of the stationary barrel 19. The contact brush 69 is secured to the rectilinear barrel 35. When the contact brush 69 becomes disposed in a position corresponding to each zoom position, the code board 68 sends a code signal to the controller 60. According to the code signal, the controller 60 determines a zoom position. After the zooming operation, driving of the zoom motor 20 is stopped to determine the zoom position finally.

The outer intermediate barrel 18 is provided with a curved groove (not shown) through which the contact brush 69 is inserted to contact the code board 68.

Note that, instead of the code board 68 and the contact brush 69, a zoom position detector may be constituted by a potentiometer, which outputs a potential of a continuously changing value for the purpose of determining each of the plural zoom positions.

Figure 11:
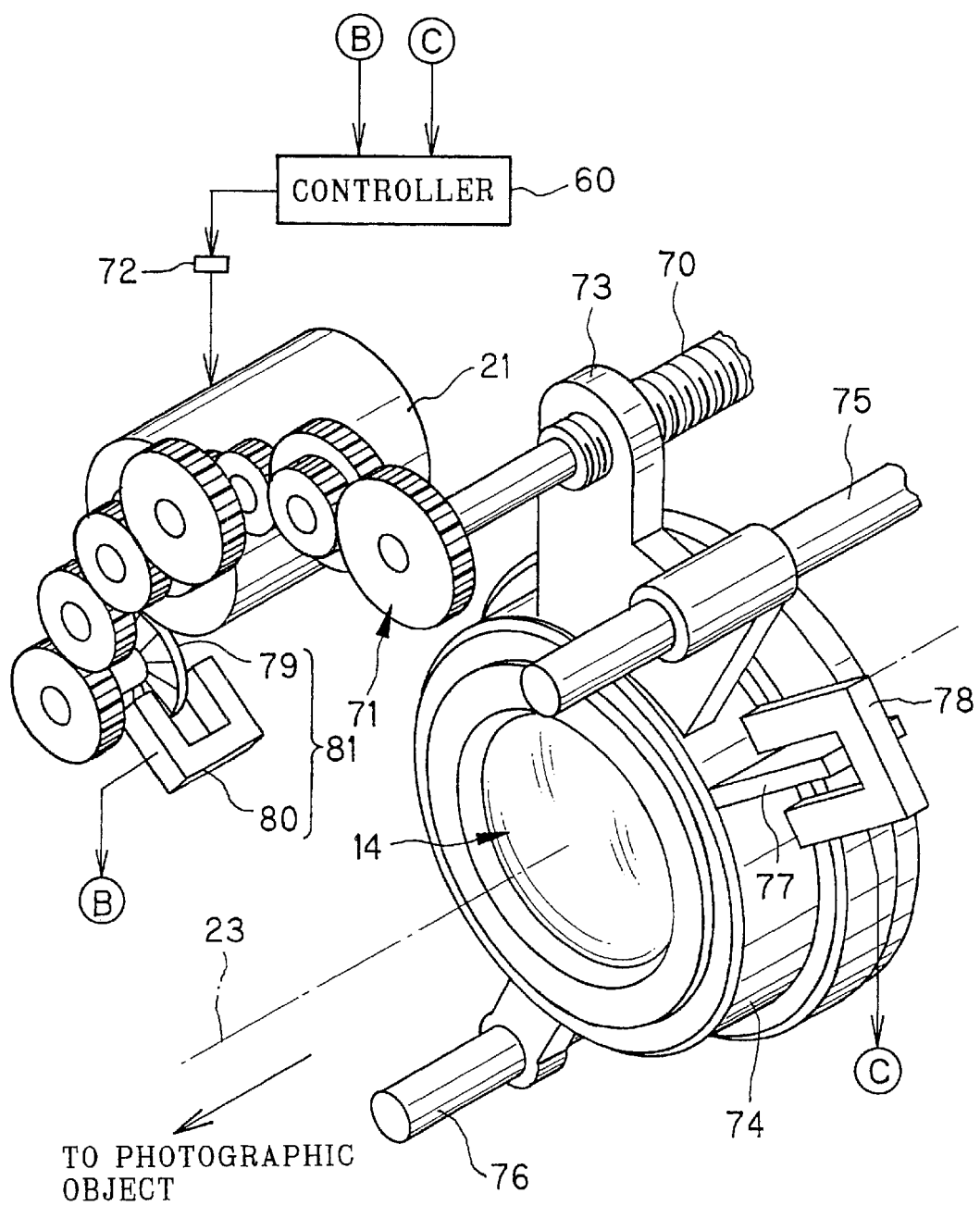
FIG. 11 is a perspective illustrating a middle lens group and relevant elements for driving the same.

Operation of shifting the focus is different between the wide-angle end and zoom positions other than the wide-angle end. For zoom positions not being the wide-angle end, the middle lens group 14 is moved along the optical axis 23 for focusing. In FIG. 11, a gear train 71 operates in response to rotation of the motor 21, and causes a screw rod 70 to rotate. A driver 72 is connected with the motor 21 for the controller 60 to control the motor 21. A nut portion 73 receives the screw rod 70 and helically coupled with the same. The nut portion 73 is formed to project from a middle lens holder 74 that supports the middle lens group 14. Two guide rods 75 and 76 support the middle lens holder 74 in a slidable manner along the optical axis 23, and also prevents the middle lens holder 74 from rotating. When the screw rod 70 rotates, the middle lens holder 74 slides. Note that there is a spring (not shown) for biasing the middle lens group 14 either forwards or backwards along the optical axis 23.

A moving amount of the middle lens group 14 is detected by a moving amount detector, which is constituted by an original position detector and a rotational angle detector. The original position detector includes an intercepting plate 77 and a photo sensor 78. The intercepting plate 77 is secured to the middle lens holder 74. The photo sensor 78 is a transmission detecting type, has a beam projector and a beam receiver, and detects a front edge of the intercepting plate 77. When zooming is completed, the middle lens holder 74 with the middle lens group 14 is moved back to an original position. The photo sensor 78 is disposed on a side of a photographic field in such a manner that, when the middle lens group 14 is in the original position, an edge of the intercepting plate 77 on the photographic field side is detected by the photo sensor 78.

The rotational angle detector consists of a rotary encoder 81, which includes an impeller 79 and a photo sensor 80. The impeller 79 has a plurality of slits. The photo sensor 80 is a transmission detecting type, has a beam projector and a beam receiver, and detects passage of each slit. The impeller 79 is connected with an element in the gear train 71, and rotates when the motor 21 rotates. The photo sensor 80 detects slits when the output shaft of the motor 21 rotates, and sends a detection signal to the controller 60 in the camera. The controller 60 counts the detection signal from the photo sensor 80, and obtains an amount of moving the middle lens group 14.

Figure 12:
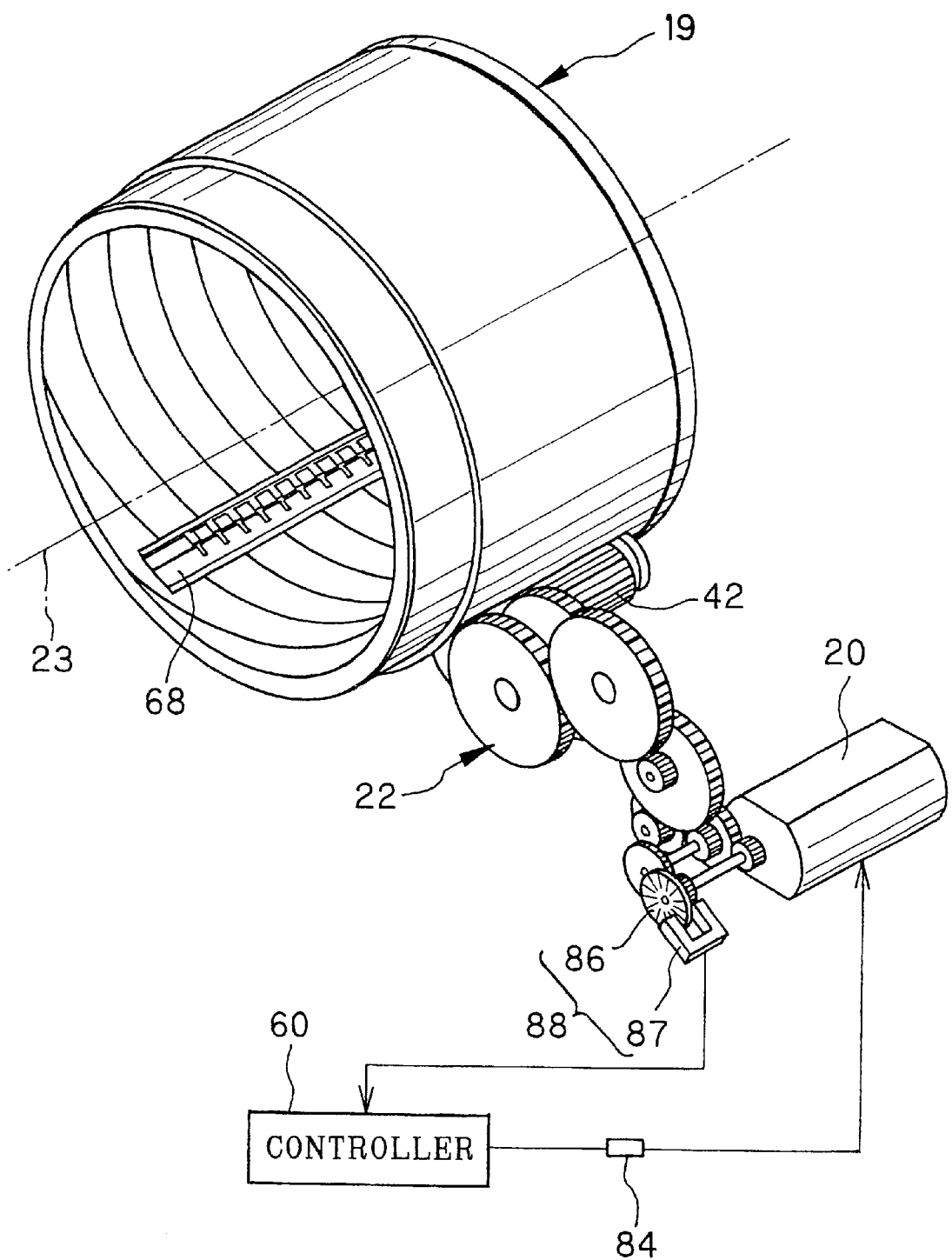
FIG. 12 is a perspective illustrating a stationary barrel and elements for driving an outer intermediate barrel.

At the wide-angle end, the zoom motor 20 is driven for focusing without driving the motor 21. In FIG. 12, the gear train 22 transmits rotation of the zoom motor 20 to the gear 42. A driver 84 is connected between the zoom motor 20 and the controller 60 for control of the zoom motor 20. A rotary encoder 88 is connected to an output shaft of the zoom motor 20, and includes an impeller 86 and a photo sensor 87. The controller 60 controls the rotary encoder 88, and determines a rotational angle of the zoom motor 20 according to a signal obtained by the photo sensor 87.

Figure 13:
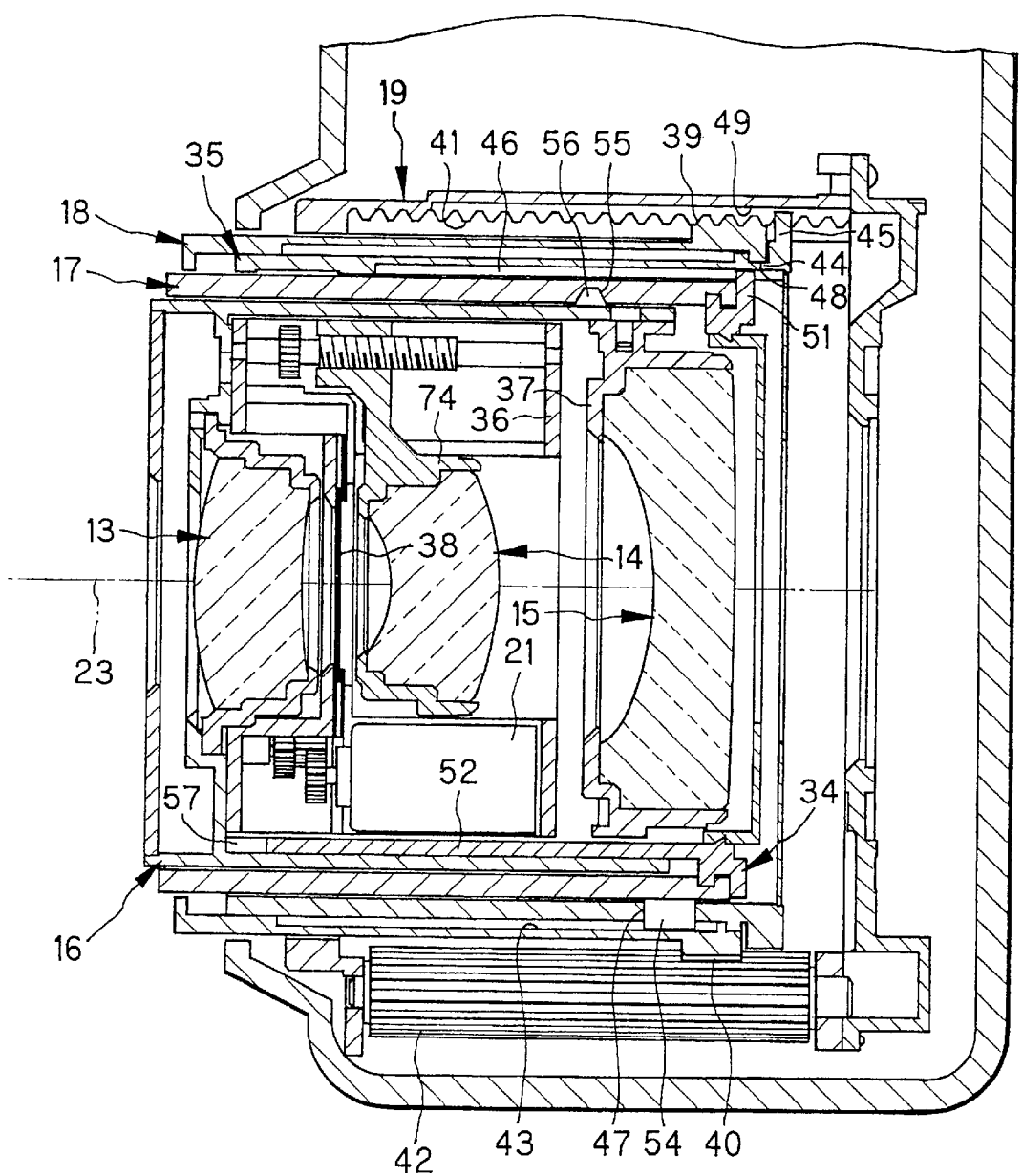
FIG. 13 is a cross section illustrating the zoom optical system and barrels set in a wide-angle end and focused to an infinite far distance.
Figure 14:
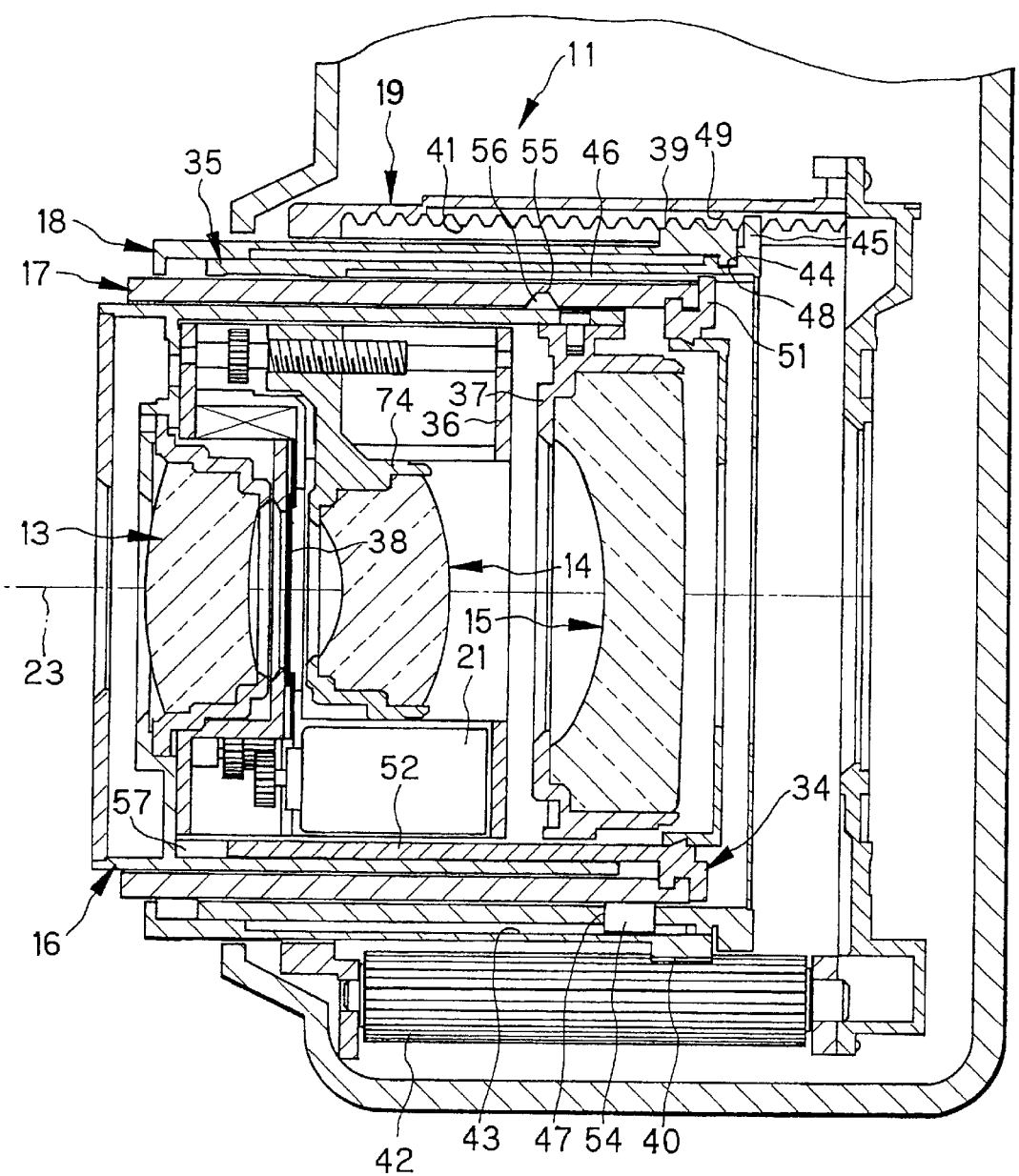
FIG. 14 is a cross section illustrating the zoom optical system and barrels set in a wide-angle end and focused to a close-up distance.
Figure 15:
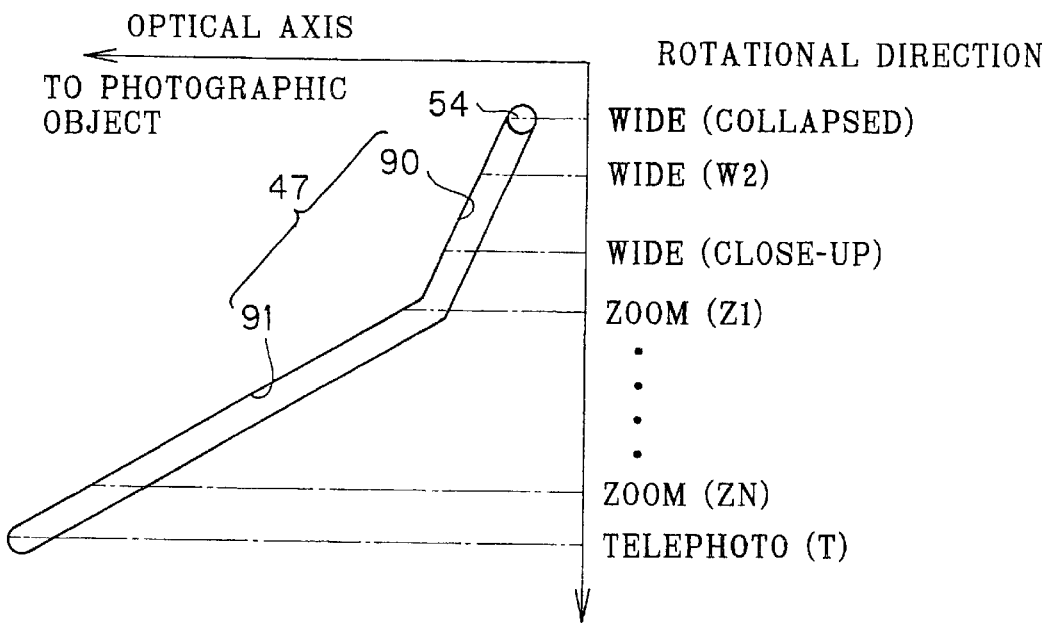
FIG. 15 is a graph illustrating a relationship between a rotating amount of the outer intermediate barrel and positions of an inner intermediate barrel along an optical axis.

In FIG. 13, a state set at the wide-angle end W2 is depicted. The zoom optical system is focused to an infinite far distance. If focusing on to an object at a near distance is desired in a close-up manner, the zoom motor 20 is driven at a predetermined amount. In FIG. 14, the lens groups 13–15 are moved in parallel with the optical axis 23. To shift the focus at the wide-angle end, the zoom motor 20 is driven at a smaller rotational amount than zooming from the wide-angle end to the second zoom position Z1 shifted by one step in a telephoto direction. It is likely that there occurs a deviation in movement upon zooming from a present zoom position to the second zoom position Z1 if the focus is simply shifted at the wide-angle end, because of backlash in the gear train 22 or play between the male and female helicoid threads 39 and 41. Thus, it is predetermined in operation to return the zoom optical system at first to the wide-angle end ready position of FIG. 8 before shifting the focus at the wide-angle end.

In Fig, 15, the first cam groove 47 includes a first groove portion 90 and a second groove portion 91. The first groove portion 90 moves the first cam follower pin 54 in parallel with the optical axis 23 according to a rotating amount of the outer intermediate barrel 18 in response to rotation of the zoom motor 20 from the collapsed position to the wide-angle end W2 where an infinite far distance is focused. The second groove portion 91 moves the first cam follower pin 54 according to a rotating amount of the outer intermediate barrel 18 in response to rotation of the zoom motor 20 front the second zoom position Z1 to the telephoto end T, the second zoom position Z1 being so determined that the zoom optical system is zoomed in by one step from the wide-angle end. The first groove portion 90 has an inclined shape different from that of the second groove portion 91 as viewed along the optical axis 23.

Figure 16:
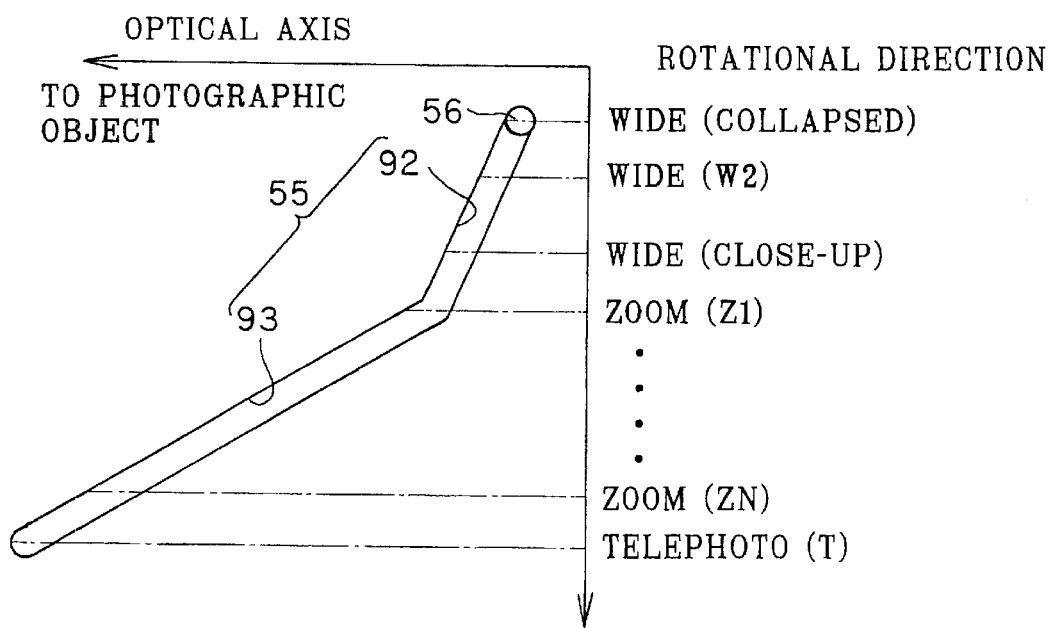
FIG. 16 is a graph illustrating a relationship between a rotating amount of the inner intermediate barrel and positions of a movable barrel along the optical axis.

In FIG. 16, the second cam groove 55 includes a first groove portion 92 and a second groove portion 93. The first groove portion 92 shifts the second cam follower pin 56 along the optical axis 23 according to a rotational amount of the inner intermediate barrel 17 while the zoom motor 20 rotates from the collapsed position to the wide-angle end W2 at which the infinite far distance is focused. The second groove portion 93 shifts the second cam follower pin 56 along the optical axis 23 according to a rotational amount of the inner intermediate barrel 17 while the zoom motor 20 rotates from the second zoom position Z1 to the telephoto end T. The first groove portion 92 has an inclination or shifting amount different from that of the second groove portion 93 as viewed in parallel with the optical axis 23.

An amount of shifting the focus at the wide-angle end is determined as a combination of lead of the male helicoid thread 39 of the outer intermediate barrel 18 and the combined shifts of the first groove portion 90, 92 of the cam grooves 47 and 55 in parallel with the optical axis 23.

ROM 62 in FIG. 10 stores first data, used at the time of the wide-angle end, for driving the zoom motor 20 according to an object distance obtained from the rangefinding unit 63. Also, ROM 62 stores second data, used at the time of a zoom position different from the wide-angle end, for driving the motor 21 for the middle lens group 14 according to an object distance. There are plural sets of the second data corresponding to the plural zoom positions.

The operation of the embodiment is described now. While the power switch remains turned off, the zoom optical system 11 is in the collapsed position of FIG. 7. The transmission rack 27 is in its upper position. The flash emitter 12 is set in the front limit position for the large illuminating angular range RW. See FIG. 2.

When the power switch is turned on, the controller 60 drives the motor 21 to move the middle lens group 14 forwards toward the photographic field. The intercepting plate 77 is detected by the photo sensor 78 described with FIG. 11, to stop the motor 21. Therefore, the middle lens group 14 is in the original position. The zoom optical system 11 is set in the wide-angle end ready position illustrated in FIG. 8.

The shutter release button is depressed. At first, the controller 60 operates the photometric unit 64 and the rangefinding unit 63 in response to halfway depression of the shutter release button. When the shutter release button is fully depressed, the controller 60 reads a rotating amount for the zoom motor 20 from ROM 62, the rotating amount being according to an object distance obtained from the rangefinding unit 63. The controller 60 drives the zoom motor 20 by monitoring the photo sensor 87 so as to rotate the zoom motor 20 by the rotating amount being read. Therefore, the movable barrel 16, the inner intermediate barrel 17 and the outer intermediate barrel 18 are moved forwards. When the rotating amount according to the object distance is obtained from a signal of the photo sensor 87, driving of the zoom motor 20 is discontinued to complete a shift of focus. The middle lens group 14 remains in the original position.

When the zoom motor 20 rotates, the gear train 22 and the transmission gear train 26 cause the rotation to move the transmission rack 27. The transmission rack 27 moves in the stroke L3 of FIG. 5. However, the non-transmission section 33 is included in the cam groove 31 in the transmission lever 29. The driving pin 27b simply moves within the non-transmission section 33 and does not rotate the transmission lever 29. Also, the spring 28 biases the transmission lever 29 in a rotational direction for the transmission section 32 to contact the driving pin 27b. Thus, the transmission lever 29 is kept positioned rotationally, so as to keep the flash emitter 12 in the front limit position for the large illuminating angular range RW.

According to object brightness obtained by the photometric unit 64, the shutter mechanism 38 is controlled to take an exposure. The flash emitter 12 emits flash light toward a photographic object in response to a sync signal obtained from the shutter mechanism 38. After the exposure, the zoom motor 20 is rotated in a backward direction reverse to the first forward direction by an amount according to the rotating amount, and returned to the state of FIG. 7. Thus, a shift of the focus at the wide-angle end is effected between the infinity focused state of FIG. 13 and the close-up focused state of FIG. 14. Even when the zoom motor 20 is driven, the flash emitter 12 is maintained in the front limit position for the large illuminating angular range RW.

When the zoom button is operated for zooming in the telephoto direction, the controller 60 drives the zoom motor 20 in monitoring an output from the code board 68. When the controller 60 detects a zoom position from the code board 68 after the zooming operation, the zoom motor 20 is stopped. If the zoom lens device comes to the second zoom position Z1 one step after the wide-angle end, a rotating amount of the zoom motor 20 is higher than that required for focusing on to a close-up object at the wide-angle end.

In response to rotation of the zoom motor 20, the transmission rack 27 is slid by transmission of the rotation. The transmission rack 27 slides down at an amount greater than a size of the stroke L3, so the driving pin 27b enters the transmission section 32. The transmission section 32 is caused to rotate the transmission lever 29 at an amount of slide of the driving pin 27b. The flash emitter 12 is set in a set position which is between the front limit position for the large illuminating angular range RW and the rear limit position for a small illuminating angular range RT, and corresponds to the present zoom position of the zoom optical system 11.

For zoom positions different from the wide-angle end, the controller 60 responds to full depression of the shutter release button, and reads a rotating amount for the motor 21 from ROM 62, the rotating amount being according to the object distance obtained by the rangefinding unit 63 and the present zoom position. The motor 21 is driven according to the rotating amount. The middle lens group 14 is moved from the original position toward the focal plane. After the movement, the shutter mechanism 38 is driven as described above to take an exposure. Then the controller 60 drives the motor 21 to move back the middle lens group 14 to the original position.

In the above embodiments, the flash discharge tube 12c of the flash emitter 12 behind the Fresnel lens 30 is slid in parallel with the optical axis 23 for changing the illuminating angular range. Furthermore, an illuminating angular range may be changed by changing an angle of portions of the reflector 12d. Also, the Fresnel lens 30 may be moved relative to the flash discharge tube 12c and the reflector 12d positioned in a stationary manner.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera comprising:
    a zoom optical system, including plural lens groups disposed on an optical axis, for being set for zooming between a wide-angle end where a focal length is short, and a telephoto end where said focal length is long;
    a lens moving mechanism for moving said zoom optical system along said optical axis, having a lens barrel movable in first and second moving regions continuous with each other, said lens barrel, when in said first moving region, zooming said zoom optical system, and when in said second moving region, focusing said zoom optical system with a predetermined focal length unchanged;
    a flash emitter, changeable in an illuminating angular range, for emitting flash light; and
    an illuminating range changer, having a transmission section and a non-transmission section, said transmission section operating when said lens barrel is in said first moving region, for changing said illuminating angular range according to said focal length, said non-transmission section operating when said lens barrel is in said second moving region, for keeping said illuminating angular range unchanged.

2. A camera as defined in claim 1, wherein in said illuminating range changer, said transmission section decreases said illuminating angular range according to an increase in said focal length of said zoom optical system, and said non-transmission section maximizes said illuminating angular range.

3. A camera as defined in claim 2, wherein said flash emitter includes:
    a flash discharge tube for emitting said flash light; and
    a Fresnel lens disposed in front of said flash discharge tube;
    said illuminating range changer adjusts a distance of said flash discharge tube from said Fresnel lens, said transmission section increases said distance to decrease said illuminating angular range according to said focal length, and said non-transmission section keeps said distance minimized.

4. A camera as defined in claim 3, wherein said illuminating range changer moves said flash discharge tube relative to said Fresnel lens.

5. A camera as defined in claim 4, wherein said first moving region corresponds to a section between a predetermined zoom position and said telephoto end, and second moving region corresponds to a section between said wide-angle end and said predetermined zoom position;
    said predetermined zoom position is defined one zoom step shifted from said wide-angle end toward said telephoto end, and said predetermined focal length is a focal length at said wide-angle end.

6. A camera as defined in claim 5, wherein said lens moving mechanism includes a zoom motor for rotating said lens barrel in said first and second moving regions;
    said illuminating range changer includes:
    a transmission plate for moving in response to rotation of said zoom motor;
    a driving pin, formed to project from said transmission plate for moving in first and second strokes, and for being in said first stroke when said lens barrel is in said first moving region, and being in said second stroke when said lens barrel is in said second moving region;
    a transmission lever for moving said flash emitter by swinging; and
    a cam groove, formed in said transmission lever, for receiving said driving pin, having said transmission section and said non-transmission section, said transmission section being pushed by said driving pin in said first stroke to swing, said non-transmission section keeping free said driving pin in said second stroke, to discontinue transmission of said driving pin to said transmission lever.

7. A camera as defined in claim 6, wherein said transmission plate slides.

8. A camera as defined in claim 7, wherein said transmission plate is a rack;
    further comprising a transmission gear train, including input and output gears, said input gears being driven by said zoom motor, said output gear being meshed with said rack.

9. A camera as defined in claim 8, wherein said flash emitter further includes a flash case for containing said flash discharge tube and for being moved by said transmission lever.

10. A camera as defined in claim 6, wherein said lens moving mechanism further includes:
    a stationary barrel for supporting said lens barrel in a rotatable manner; and
    at least one movable barrel for supporting said zoom optical system, and for moving along said optical axis in response to rotation of said lens barrel.

11. A camera as defined in claim 10, further comprising a focusing motor for moving one of said plural lens groups along said optical axis to focus said zoom optical system while in said first region.

12. A camera comprising:
   a zoom optical system, including plural lens groups disposed on an optical axis, for being set for zooming between a wide-angle end where a focal length is short, and a telephoto end where said focal length is long;
   a lens moving mechanism for moving said zoom optical system along said optical axis using a first motor, having a lens barrel movable in first and second moving regions continuous with each other, said lens barrel, when in said first moving region, zooming said zoom optical system using the first motor, and when in said second moving region, focusing said zoom optical system with a predetermined focal length unchanged using the first motor;
   a flash emitter, changeable in an illuminating angular range, for emitting flash light,
   a lens focusing mechanism comprising a second motor connected to the lens groups to allow relative movement between the lens groups, the lens focusing mechanism being enabled to cause said relative movement only when the lens barrel is in the first moving region; and
   an illuminating range changer, having a transmission section and a non-transmission section, said transmission section operating when said lens barrel is in said first moving region, for changing said illuminating angular range according to said focal length, said non-transmission section operating when said lens barrel is in said second moving region, for keeping said illuminating angular range unchanged.

13. The camera of claim 12, wherein the lens barrel is in the second moving region only when the zoom optical system is positioned at the wide-angle end.

14. The camera of claim 12, wherein an entirety of a range of motion of the movable lens barrel consists of a single said first moving region and a single said second moving region.

15. A camera comprising:
   a step zoom optical system comprising a plurality of lenses arranged on an optical axis;
   a lens moving mechanism connected to the step zoom optical system to cause the step zoom optical system to move among a set of predefined focal lengths along the optical axis using a first motor, having a lens barrel movable in first and second moving regions continuous with each other, said lens barrel, when in said first moving region, moving the zoom optical system between respective said predefined focal lengths using the first motor, and when in said second moving regions, focusing said zoom optical system without changing said focal length using the first motor;
   a lens focusing mechanism comprising a second motor connected to the lenses to allow relative movement between the lenses, the lens focusing mechanism being enabled to cause said relative movement only when the lens barrel is in the first moving region;
   a flash emitter, changeable in an illuminating angular range, for emitting flash light; and
   an illuminating range changer mechanically connected to the first motor so as to modify the illuminating angular range in accordance with movement of the lens barrel within the first moving region, while not modifying the illuminating angular range in accordance with movement of the lens barrel within the second moving region.

16. The camera of claim 15, wherein the lens barrel is in the second moving region when the zoom optical system is positioned at a wide-angle end.

17. The camera of claim 15, wherein an entirety of a range of motion of the movable lens barrel consists of a single said first moving region and a single said second moving region.

* * * * *